United States Patent Office 3,545,236
Patented Dec. 8, 1970

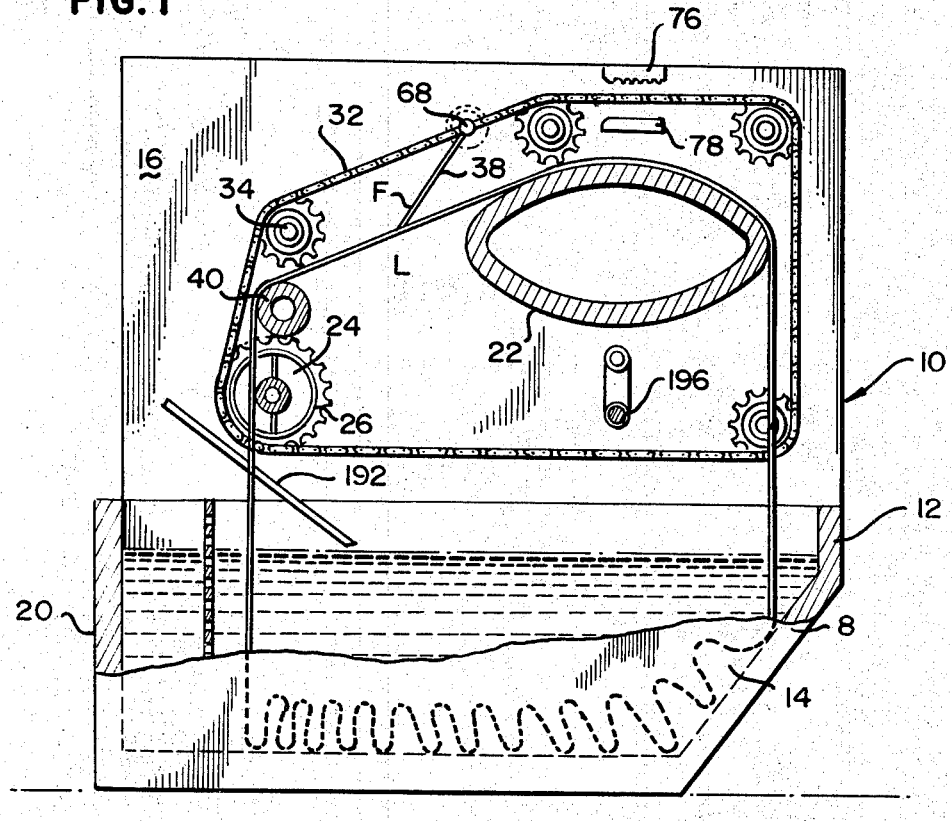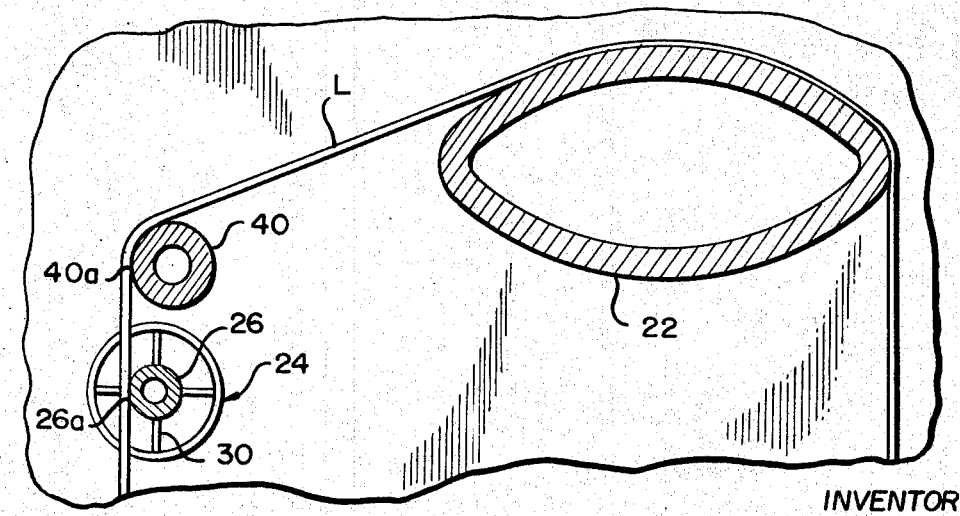

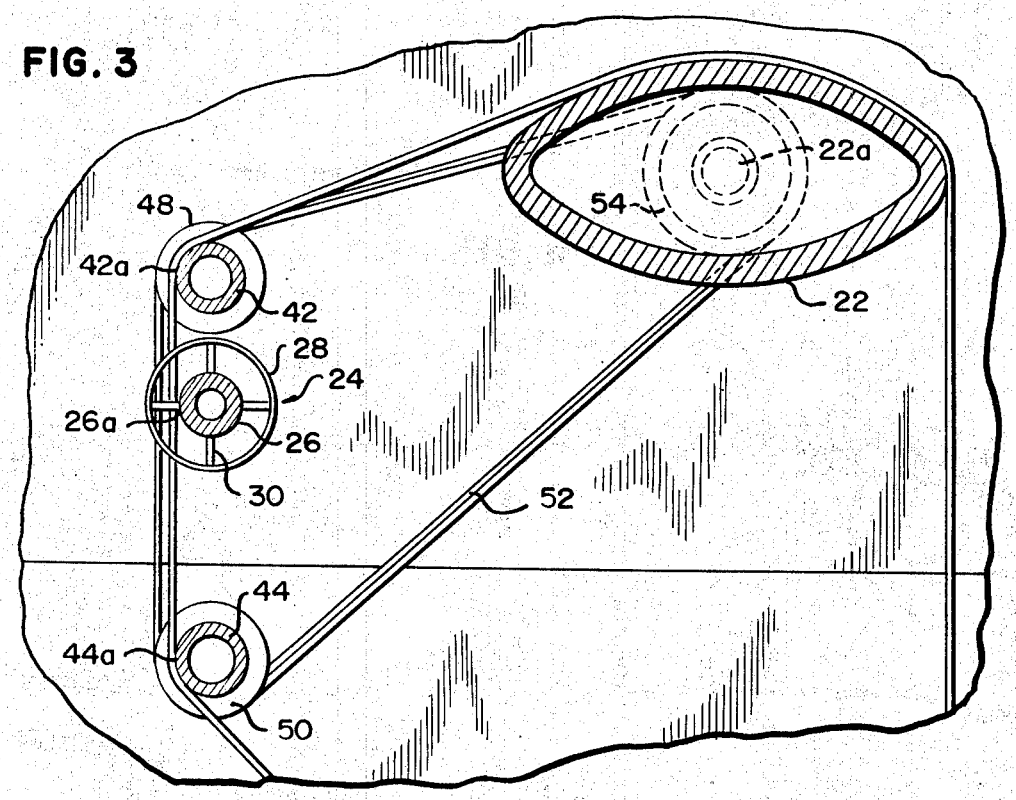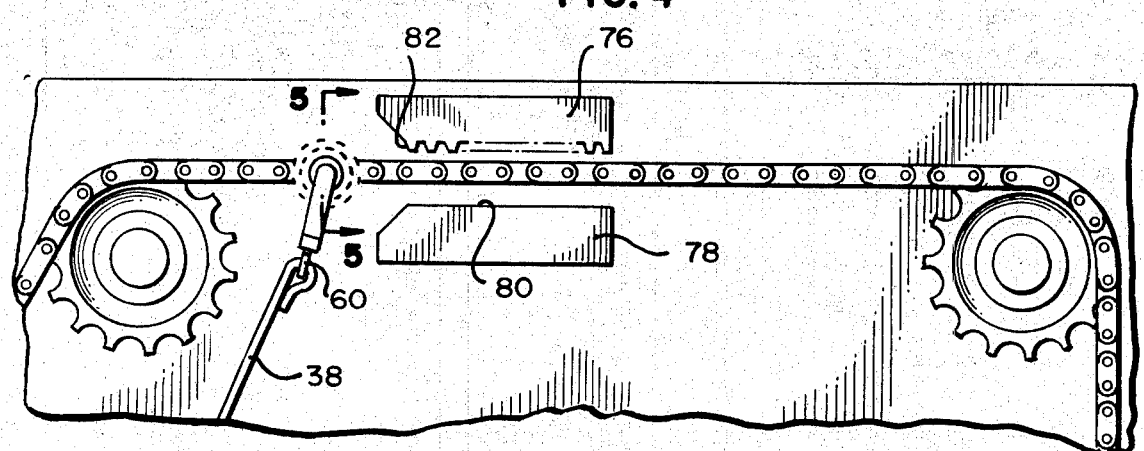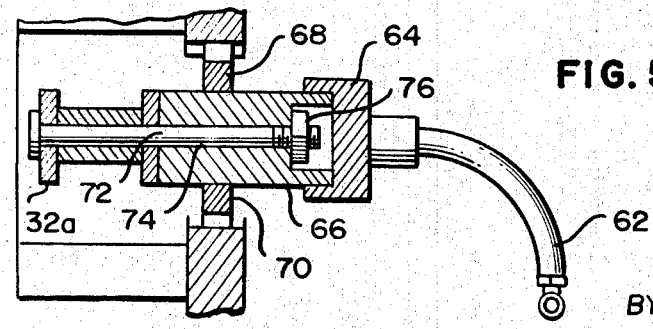

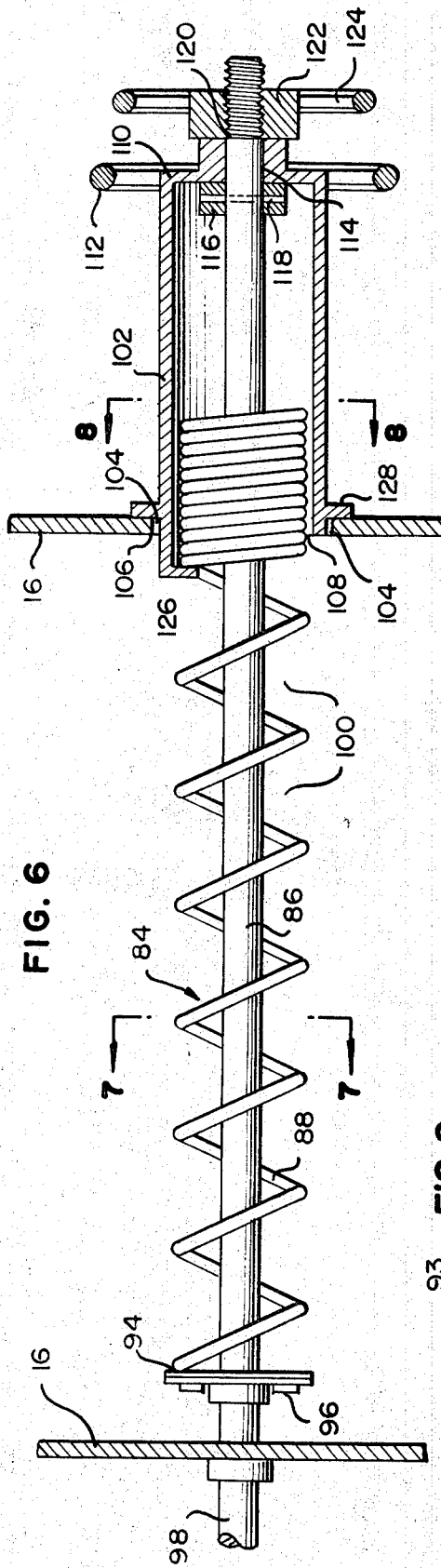
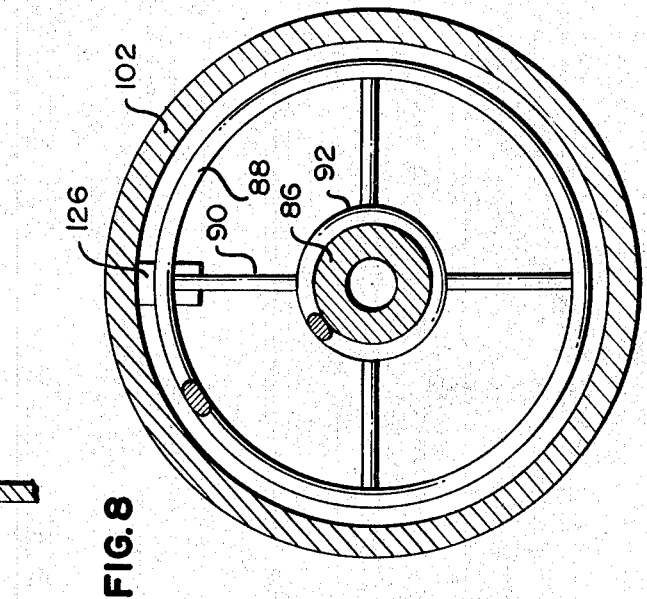
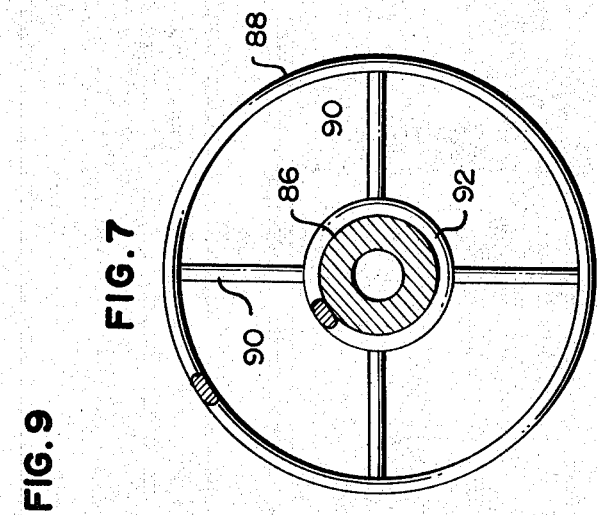
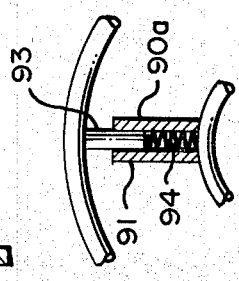

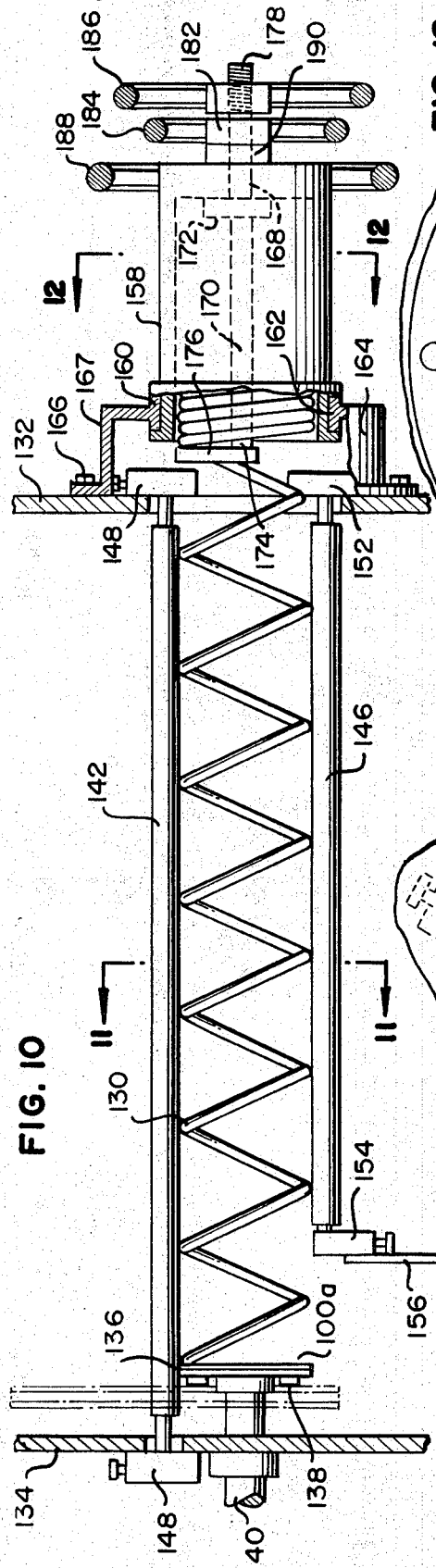
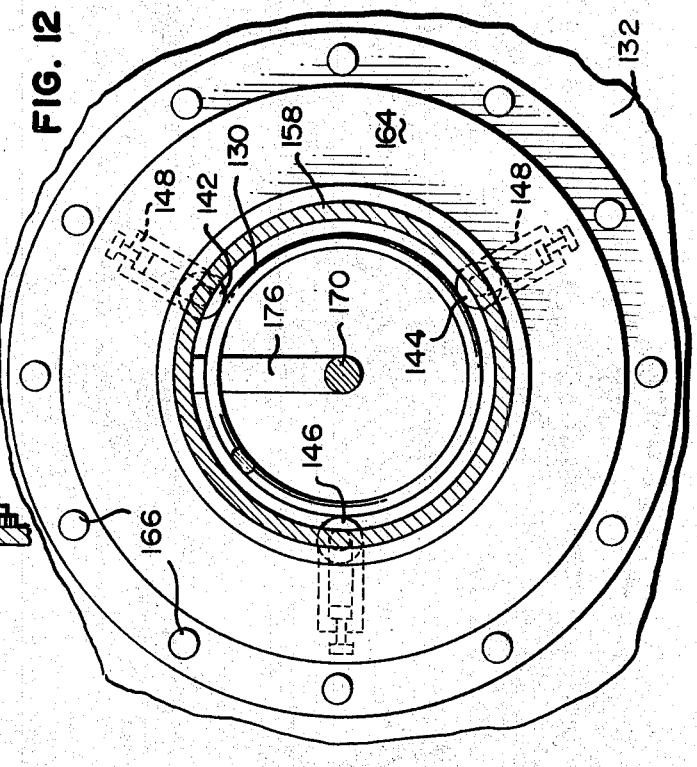
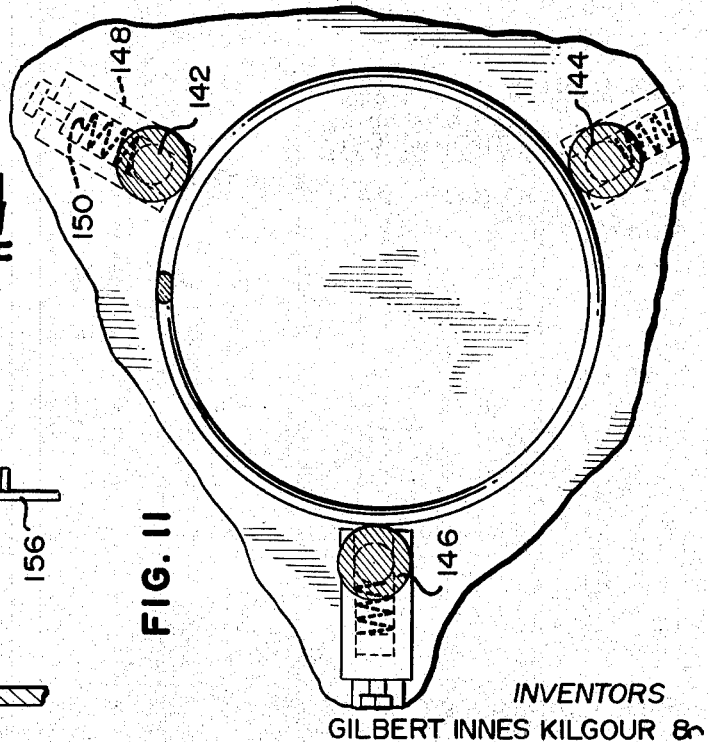

3,545,236
APPARATUS FOR TREATING FABRICS IN ROPE FORM
George Edward Ziegler, Balloch, Alexandria, and Gilbert Innes Kilgour, Gartocharn, Scotland, assignors to United Merchants and Manufacturers, Inc., New York, N.Y., a corporation of Delaware
Continuation of application Ser. No. 722,667, Apr. 19, 1968, which is a continuation-in-part of applications Ser. No. 405,888, Oct. 20, 1964, and Ser. No. 630,154, Jan. 11, 1967, which in turn is a division of applications Ser. No. 405,888, and Ser. No. 713,119, Mar. 14, 1968. This application June 25, 1969, Ser. No. 836,271
The portion of the term of the patent subsequent to Aug. 12, 1986, has been disclaimed
Int. Cl. B65h 75/02; D06f 35/00
U.S. Cl. 68—176     20 Claims

ABSTRACT OF THE DISCLOSURE

A "Spiral Apparatus" of the Ziegler et al. type described in U.S. Pat. No. 3,308,639, granted Mar. 14, 1967, and U.S. Pat. No. 3,379,494, granted Apr. 23, 1968, wherein a roller arrangement is provided in association with the spiral guide member and feed reel to eliminate frictional drag on the roped fabric and means is associated with the carrier chain to impart a positive de-twisting action to the fabric through the point of attachment of the fabric to the carrier chain and guide and control and stop means are provided for the loading and operation to be carried out without tangling or fouling of the roped fabric on the feed reel or overloading of the apparatus and a variable geometry spiral guide member is provided wherein the number of turns of the helix of the spiral guide member in the apparatus may be varied for a particular cloth density and load of fabric.

CROSS-REFERENCES TO RELATED APPLICATIONS

This application is a continuation of Ziegler et al. U.S. application Ser. No. 722,667, filed Apr. 19, 1968 (now Pat. No. 3,460,362), which application is a continuation-in-part of Ziegler et al. U.S. application Ser. No. 405,888, filed Oct. 20, 1964, now U.S. Pat. No. 3,308,639; and of Ziegler et al. U.S. application Ser. No. 630,154, filed Jan. 11, 1967, as a divisional application of U.S. application Ser. No. 405,888 and now U.S. Pat. No. 3,379,494 and of Ziegler et al. U.S. application Ser. No. 713,119, filed Mar. 14, 1968.

BACKGROUND OF THE INVENTION

Field of the invention

The present invention generally appertains to new and novel improvements in apparatus for forming a roped fabric helix in a tank, such as a dye-beck or box, with such helix being composed of successive spaced apart loops that are revolved in the tank so as to be continuously treated with a liquid or fluid in the tank, either of the open or closed pressure type. Such basic apparatus is disclosed in the foregoing recited Ziegler et al. patents and applications.

More particularly, the present invention relates to new and novel improvements in the basic spiral apparatus, particularly in connection with guide and control means for eliminating frictional forces between the roped fabric and the spiral guide member and for ensuring proper loading of the apparatus, without tangling or fouling of the roped fabric and without overloading of the apparatus, and a variable geometry spiral guide member wherein the pitch of the turns or convolutions of the helical coil member, which essentially constitutes the spiral guide member, may be selectively varied and altered for a particular cloth density and load of fabric.

Description of the prior art

The Ziegler et al. apparatus, as disclosed in the aforementioned patents and applications, essentially comprises a main drive reel which is rotatably mounted in the tank adjacent the rear thereof and above the liquid bath chamber in the bottom of the tank, a rotatable spiral guide member or reel mounted in the tank adjacent the front thereof and disposed parallel with the main reel and an endless carrier chain to which the leading end of the roped fabric is attached, with the carrier chain moving in an orbital path vertically about one end of the adjacent ends of the main reel and the spiral guide member.

SUMMARY OF THE INVENTION

The present invention relates to new and novel improvements in the basic spiral apparatus, as disclosed and claimed in the aforementioned Ziegler et al. patents and applications.

In essence and generally stated, the improvements may be summarized as follows:

(1) The provision of an idler reel or roller which is mounted for rotation between the end wall suporting structures of the tank and positioned above the spiral guide member so that its outer face is disposed in a vertical plane in advance of the plane in which the front face of the center shaft of the spiral guide member lies, whereby the loops are maintained out of surface contact with the stabilizing and supporting shaft of the spiral guide member and the fabric travels in a more vertical position in relation to such center shaft of the spiral guide member so that drag reduction is completely eliminated and a possible creasing of the roped fabric is obviated, such creasing resulting in irregular streaking and dyeing of the fabric.

(2) The positioning of one or two driven rollers above and below the spiral guide member in such a manner that the fabric is at most in tangential contact with the said supporting and stabilizing shaft of the spiral guide member, such rollers being driven by a drive means from the main drive reel so that the surface speeds of the drive reel and the roller or rollers are identical or nearly identical.

(3) The formation of the helical rodlike or wire member of the spiral guide member from stainless spring steel or other non-corrodible flexible material, particularly in respect of the spokes supporting the helix on the center stabilizing and supporting shaft, so that the helix is capable of a degree of lateral distortion so as to disturb the fabric as little as possible from its normal running plane as it leaves the dye box or chamber in the tank and enters the system of idler or driven rollers and the spiral guide member.

(4) The provision of a positive de-twisting device in association with the attachment of the leading end of the fabric to a flexible arm or shaft on the carrire chain so that with every revolution of the carrier chain a left or right-hand twist is positively inserted in the fabric according to whether the drive is on the left or on the right-hand side of the beck, such being accomplished by a sprocket carried by the flexible shaft and adapted to walk through a fixed rack path and capable of transmitting the de-twisting action positively to the fabric.

(5) The provision of a curved stationary guide bar to cause the roped fabric to slide into the first pocket of the spiral guide members during loading or running of the apparatus, as the first loop is being formed by the carried chain in the pocket of the spiral guide member adjacent to the carrier chain.

(6) The provision of stop and control means in the event of fabric becoming tangled or fouled on the winch roller or in the event of an error in the loading of the spiral apparatus and the result of the fabric extending in length beyond the last pocket of the spiral guide member.

(7) A variable geometry spiral in which two concentric helixes are mounted on a supporting shaft and are connected to one another by flexible supporting spokes with the inner helix having a diameter only slightly larger than that of the supporting shaft and being slidably and rotatably mounted on the supporting shaft and with the other helix being of whatever diameter is required to support and guide the fabric and form the desired diameters of the movable pockets of the spiral guide member. The concentric system of hexlices may be constructed from suitable non-corrodible spring steel or other flexible material and a number of turns of the helix in the machine may be selected for a particular cloth density and load of fabric. The turns of the helix not required on a given occasion are held in a storage compartment rotatably mounted on one end wall structure of the tank. The storage compartment is designed to allow selected turns of the helix to be released or returned as required by means of a traveller carried by the compartment and engagingly operating on the helix.

(8) The provision of a spiral guide member which essentially comprises an internally unobstructed and unsupported helical coil that is externally supported and stabilized by a plurality of idler rollers placed around the circumference thereof in an engagement with the crests of the convolutions or turns of the helical coil; such may be of a variable geometry type and, therefore, provided in association with a storage compartment situated at one end wall structure of the tank and designed to allow selected turns of the helix to be released or returned as required, whereby the pitch of the helical coil may be varied and, consequently, the width spacing of the movable pocekts defined by the turns or convolutions of the helical coil may be varied in accordance with various operating conditions, such as a particular cloth density and load of fabric.

BRIEF DESCRIPTION OF THE DRAWINGS

FIG. 1 is an interior end elevational view of the spiral apparatus embodying the improvements of the present invention.

FIG. 2 is an enlarged detailed elevational view, showing more particularly the provision and relative placement of the idler roller.

FIG. 3 is a view similar to FIG. 2 but showing a modified form of roller arrangement in association with the spiral guide member.

FIG. 4 is a fragmentary elevational view, on an enlarged scale, of the positive de-twisting arrangement, shown generally in FIG. 1.

FIG. 5 is a detailed transverse cross-sectional view, taken substantially on line 5—5 of FIG. 4.

FIG. 6 is a detailed front elevational view of an improved form of spiral guide member, with a portion of the storage compartment for the variable geometry helix composing the spiral guide member being shown in section in mounted assembly with the supporting end wall structure of the tank.

FIG. 7 is the tarnsverse cross-sectional view, taken substantially on line 7—7 of FIG. 6.

FIG. 8 is a transverse cross-sectional view, taken substantially on line 8—8 of FIG. 6.

FIG. 9 is a fragmentary detailed sectional view of the modified form of spring-loaded, telescopic spoke connection arrangement between the inner and outer concentric helices of the spiral guide member of FIG. 6.

FIG. 10 is a further modified form of spiral guide member, which essentially comprises an internally unobstructed helical rod-like or wire member that is externally supported by idler rollers and which is provided in association with a storage compartment or casing, along the lines of the storage arrangement of FIG. 6, whereby the pitch of the helical coil member may be selectively varied.

FIG. 11 is an end elevational view of the roller arrangement of FIG. 10.

FIG. 12 is a transverse cross-sectional view, taken substantially on line 12—12 of FIG. 10.

DESCRIPTION OF THE PREFERRED EMBODIMENTS

Figure 13:
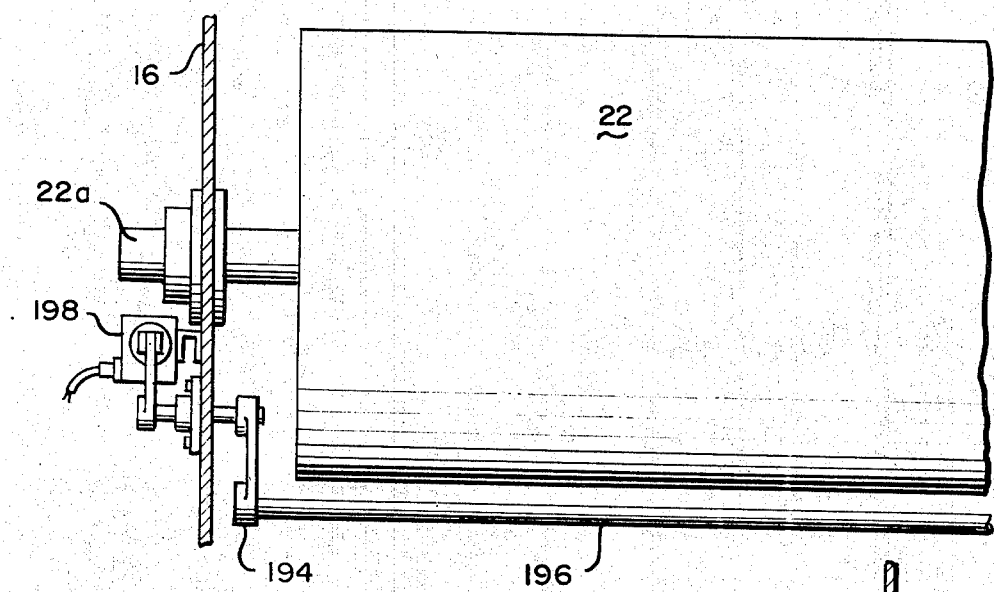
FIG. 13 is a front elevational view, illustrating a stop control means in association with the main or feed reel and provided for the purpose of stopping the machine in the event of the roped fabric becoming tangled or fouled on the main reel.

Referring now more particularly to FIGS. 1 and 2, the spiral apparatus, generally designated by the numeral 10, essentially includes a tank 12 having a liquid chamber 14 in its bottom and having opposing end wall structures 16, of which only one is shown in FIG. 1. The tank has an inwardly and downwardly sloping back wall 18 and a front wall 20 which constitute, along with the end walls, the liquid bath chamber 14, that is adapted to contain a supply of suitable treating liquid or fluid.

The tank, shown in the drawings, is of the open type but a closed tank can be used, which would include a cover for the tank 10 and which would be designed to maintain the treating fluid at elevated temperatures and/or under pressure. The treating fluid can be of any of the known fluids employed in scouring, bleaching or dyeing fabrics.

A main reel 22, which is elliptical in cross-section but which can be of any other suitable cross-section configuration, is mounted for rotation between the end wall structures and is positioned towards the back wall 18 of the tank above the liquid chamber 14. The main reel 22, which constitutes a feed or draw-in roll and which controls the intake speed of the roped fabric moved into the apparatus, is driven by a prime mover (not shown) and is the driver for the roped fabric and for all of the loops being processed.

A spiral guide member or reel 24, which is of the open helical rod-like or wire formation, is formed and rotatably positioned in the same manner as disclosed in the Ziegler et al. patents and application.

The spiral guide member is rotatably mounted between the tank end walls in a horizontal position in the upper portion of the tank adjacent to the front 20 thereof. The spiral guide member is disposed in front of the main reel and is positioned in parallelism therewith. The spiral guide member, as shown in FIGS. 1 and 2, is in the form of a center supporting and stabilizing shaft 26 around which an open helical rod-like or wire member 28 is disposed and to which it is attached by radial spokes 30 which are arranged in a spiral configuration. The spiral guide member, being in the form of an open helical coil, has spaced apart turns or convolutions which define movable pockets and the spiral guide member functions, during the loading of the apparatus tank, as a guide means to guidingly space the loops L along the main reel 22 in spaced side by side helical arrangement and functions, during the liquid or fluid treating operation of the apparatus, as a rotatable guide or peg rail, in the sense that it rotates about its axis, to maintain the loops in proper spaced apart order as they are formed and reformed in being revolved through the liquid chamber 14 in a relaxed form in the chamber.

An endless conveyor chain 32 is entrained around guiding sprockets 34, one of which is a driving sprocket, with the sprockets being located in the arrangement shown in FIG. 1 at the tank end wall structure that contains the drive arrangement. The driving sprocket is driven by a drive arrangement, which is connected to the main reel and which also drives the spiral guide member 28 in the manner disclosed in Ziegler et al. Pat. No. 3,308,639. The drive arrangement ensures the rotation of the main reel 20 directly from the prime mover and at controlled surface speeds, with the spiral guide member 28 and the chain 32 moving in a timed relationship. The chain is provided with a finger 36 to which the leading end 38, in the form of a short leader cord or tape, of the roped fabric F is attached and the conveyor chain moves about the sprockets 34 in an orbital path vertically around the adjacent end of the main reel 22 and the spiral guide member 24. The chain reforms the loop while the successive loops are formed, in consequence of such formation, and the successive loops are laid up along the lengthwise or axial extent of the main reel 22.

As pointed out in the foregoing, in order to eliminate creasing of the material as the fabric passes up and over the spiral guide member 28 in the return of the loops to the main reel 22, which crease lines in the roped fabric results in irregular streaking and dyeing of the fabric, an idler reel 40 is provided, in accordance with the present invention. The idler reel 40 is mounted for free rotation between the end wall supporting structures and is positioned above the spiral guide member 28, as shown more particularly in FIG. 2. The idler reel 40 is located above the spiral guide member so that its outer or front face 40a is disposed in a vertical plane in advance of the plane in which the front face 26a of the center shaft lies. Thus, the front face 40a of the idler reel 40 is disposed so that the loops L are maintained out of surface contact with the stabilizing and supporting shaft 26 and the fabric travels in a more vertical position in relation to the center shaft 26 of the spiral guide member. In this fashion, drag reduction is substantially eliminated and the creasing condition is obviated.

The location of the idler reel 40 to the center shaft 26 of the spiral guide member is such that the face or outer surface 40a of the idler reel 40 receives the loop fabrics L in a position as to hold the fabric slightly away from the center shaft 26 of the spiral guide member but not to the extent to allow the fabric to pass radially beyond the vertical pockets defined by the convolutions or helical turns of the rod-like or wire member, that is, outwardly past the crests of the helical turns or convolutions of the wire member 28. With reference to FIG. 3, a driven roller supporting arrangement is shown. As illustrated, the same essentially includes either an upper driven roller 42 and/or a lower driven roller 44. The roller 42 is disposed above the spiral guide member or reel 24 with its outer or front face 42a lying in a vertical plane in advance of the plane in which the front face 26a of the supporting shaft 26 for the spiral guide member lies. The lower roller 44 is disposed well below the spiral guide member and is positioned just slightly above the liquid chamber 14 with its outer or front face 44a in line with the face 42a of the upper roller 42.

By providing the upper and lower driven rollers or even by providing one of the rollers, it has been found that friction will not result between the textile material and the supporting shaft 26 of the spiral guide member and, consequently, chafing or rubbing of the fabric will be completely eliminated. The upper and lower rollers are positioned above and below the spiral guide member in such a manner that the fabric is out of contact with the shaft 26 of the spiral guide member or, at most, is only in tangential contact with the outer face 26a of the shaft 26.

The rollers 42 and 44 are rotatably mounted between the end wall supporting structures and disposed parallel with the main reel 22 and the spiral guide member 24.

The rollers 42 and 44 are provided at one of their ends with pulleys 48 and 50 and are driven by a V-belt 52 which is entrained around a pulley 54 on the end supporting shaft 22a of the main or feed reel 22.

In place of the feed belt pulley drive, suitable gearing from the shaft 22a supporting the main reel or feed reel may be provided. In any event, the rollers 44 and 42, which serve to guide the loops below and above the pockets of the spiral guide member and maintain the rope fabric out of damaging contact with the surface of the shaft 26a of the spiral guide member, are driven by the main reel so that they have surface speeds which are identical or nearly identical with the main reel.

Figure 15:
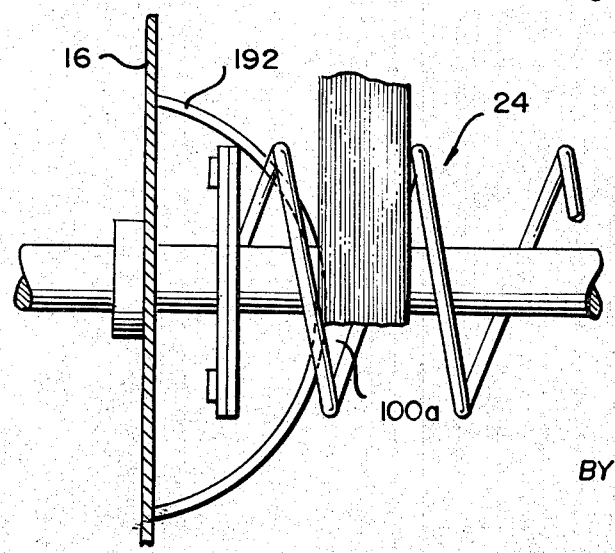
FIG. 15 is a fragmentary detailed plan view of the guide arrangement, shown generally in FIG. 1, and which is provided in association with the initial or first pocket of the spiral guide member for the purpose of causing the roped fabric to slide into the first section of the spiral guide member during loading or running of the apparatus.

In connection with the handling of delicate fabrics, such as crepes, voiles and cloques, which have low cloth densities or low specific volumes in the wet state, frictional forces between the wet fabric and the rod-like or wire helical coil 28 or the spokes 30 connecting the turns to the center stabilizing shaft 26, may be considerably reduced by constructing or fabricating the helical coil member and the spokes of stainless spring steel or other non-corrodible flexible material. This is particularly so in respect of the spokes 30 supporting the metal helical coil on the shaft so that the helical coil is capable of a moderate degree of lateral distortion. In other words, the individual pockets through which the loops pass are defined by opposing and spaced apart turns, as shown in FIG. 15. As shown therein, the helical turns are capable of a moderate degree of lateral distortion, relative to the longitudinal axis of the supporting shaft so as to disturb the fabric as little as possible from its normal running plane as it leaves the bottom chamber 14 and enters the system of idler or driven rollers as shown in FIGS. 2 and 3, and the spiral guide member and passes on to the feed or main reel 22.

It has been found that the carrier chain 32 in making one circuit of the main reel 22, the spiral guide member 24 and the driven or idler roller arrangements of either FIGS. 2 and 3, tends to insert a twist into the fabric, during the formation of the loop as disclosed more particularly in Ziegler et al. Pat. No. 3,308,639. This insertion of twist into the fabric, which is caused by the formation of the loop, may be accentuated or minimized by the natural tendency of certain fabrics on account of the woven or knitted construction thereof to twist. Fabrics of twill or gabardine construction are notorious in this respect and cause considerable problems which usually take the form of streaky or uneven dyeing or dyes which penetrates into the yarn or fiber. In order to obviate this, it is proposed to provide with every circuit of the carrier chain a positive detwisting action to the fabric at the point of attachment of the leading end 38 of the roped fabric to the carrier chain. With every revolution of the carrier chain a left or right hand twist is inserted into the fabric according to whether the drive is on the left or on the right hand side of the tank. As shown in FIG. 1, and more particularly FIGS. 5 and 6, means is provided so that a positive detwisting action is imparted through the fabric to the point of attachment of the fabric to the carrier chain. In this regard, the terminal end of the leading end 38 of the roped fabric is attached by an eye 60 to the free end of a curved or arcuate flexible arm or shaft 62. The opposite end of the flexible shaft 62 is fixed by a collar 64 to one end of a hollow shaft 66 on which a sprocket 68 is fixedly circumposed, as by welding 70. A pin 72 is disposed through the axial bore 74 of the hollow shaft and has its inner end anchored by a nut 76 within the counter-bored inner end of the shaft that is surrounded by the collar 64. The pin 72 is freely rotatable within the hollow shaft and has its opposite end fixed to one of the links 32a of the chain, as shown in FIG. 6. The sprocket 68 is adapted to move through a pathway defined by a fixed rack 76 and a confronting bar 78 with the upper surface 80 of the bar confronting in spaced relation the depending fixed teeth 82 of the overhead rack. The chain passes between the surfaces 80 and 82, as shown in FIG. 5, and there is sufficient room for the sprocket 68 to move through such space with the teeth of the sprocket engaging the teeth of the rack 82 so that the sprocket walks along the fixed rack and moves one full 360° rotational movement to twist the shaft 62 one complete turn. The arm 62 is flexible and capable of transmitting the detwisting action positively to the fabric. The flexible arm is constructed from suitable noncorrodible material or flexible metal.

A left or right hand twist may be inserted by positioning the rack 76 above or below the carrier chain. As shown in FIG. 5, the rack is positioned above the carrier chain, but the rack could be below the carrier chain. The placement of the rack relative to the carrier chain, that is whether above or below it, entails the positive insertion of a left or right hand twist in the fabric loop.

Attention is now directed to FIG. 6 through 9, wherein a variable geometry spiral guide member 84 is illustrated. The spiral guide member 84 includes a center supporting and stabilizing shaft 86 which is rotatably positioned between the end wall supporting structures 16, in the same placement relative to the main reel 22 and the tank walls and bottom chamber as the spiral guide member 24 of FIGS. 1 and 3, which illustrate the same in accordance with the disclosures in the Ziegler et al.

The spiral guide member includes the helical rodlike or wire member 88 which is attached by radial spokes 90 to an inner helical rodlike or wire member 92 that is rotatably slidably circumposed dircetly on the surface of the shaft 86 in sliding bearing engagement thereof. The turns of the inner coil 92 complement the turns of the outer or operative coil 88, which defines the movable pockets, in stabilizing and supporting other wire member 88 on the supporting shaft 86. The inner and outer concentric rodlike or wire members 92 and 88 are attached to an end plate 94, which in turn is attached to an end plate 96 on a drive shaft 98 whereby the spiral guide member 84 is rotated.

The concentric system of helices may be constructed from suitable non-corrodible spring steel or other flexible material and the number of turns of the helix in the machine may be selected for a particular cloth density and load of fabric. In other words, the pitch of the helical wire member 80 may be varied in accordance with operating conditions, particularly with relation to cloth density and load of fabric. By changing the pitch, the distance between the turns is altered or varied so that width spacing of the movable pockets 100, which are constituted or defined by the adjoining convolutions or turns of the outer helical member 80, is altered and varied under different operating conditions.

In order to accomplish this, a cylindrical storage barrel or casing 102 is provided at the end wall structure opposite the driving shaft 98, as shown in FIG. 7. The cylindrical storage barrel or casing 102 is rotatably mounted within a sealing bearing arrangement 104 which is provided in an opening 106 in the end wall structure opposite to the driving shaft end wall structure. The storage barrel 102 has an open inner end 108 which faces into the interior of the tank and is formed with a closed outer end wall 110 around which a hand wheel 112 is positioned in order to enable the barrel to be rotated manually within the bearings 104. The shaft 86 extends centrally through the barrel and through a center opening 114 in the closed end thereof. The shaft extends through a collar 116 fixed by a pin 118 on the shaft so as to locate the shaft in position relative to the end 110 of the barrel casing or housing. The exterior end portion 120 of the shaft is exteriorly threaded to receive a jam nut 122 that is provided with a hand wheel 124 for rotating it.

The open inner end of the cylindrical storage barrel casing or compartment 102 is provided at its periphery with an inwardly directed radial finger 126 which is in constant engagement with the turns or convolutions of the helical rodlike or wire member 80.

The cylindrical storage barrel or casing 102 is provided, adjacent its open end, with an outwardly extending, radially disposed bearing shoulder or flange 128 which is adapted to engage the outer surface of the supporting end wall structure so as to locate the casing and prevent the casing from being drawn inwardly of the supporting end wall structure under the inward pull exerted on the finger 126 by the stored turns or convolutions of the helical rodlike or wire member 80 only when the spiral is being adjusted. During the rotating operation of the spiral guide member, the shoulder is out of engagement with the end wall, or at most, is in frictionless contact therewith.

It can be appreciated, with consideration of FIG. 6, that the pitch of the helical wire member 80 may be easily varied so as to vary the widthwise spacing of the pockets 100 within which the loops of roped fabric are positioned. In order to decrease or increase the pitch and, consequently, the width of the pockets 100, it is only necessary to release the jam nut 122, so that the barrel casing 102 can be rotated relative to the supporting and stabilizing shaft 86, that is held against rotation by the driving shaft, which, in turn, is in a stationary relationship with the drive arrangement. By releasing the jam nut 122 the casing can then be rotated, either clockwise or counter-clockwise, about the shaft and, dependent upon the direction of rotation, the finger or traveller 126 will draw in or release from the storage casing, the desired number of turns or convolutions of the helical wire member 88. Obviously, since the supporting inner coil 92 is attached through the spokes 90 to the outer coil, which is directly engaged by the finger or traveller 126, the inner and outer coils will move in a companion, concentric relationship.

If found necessary, the spokes 80 may be formed in telescopic fashion, as shown in FIG. 9, with the spokes 90a of FIG. 9 including an outer tubular member 91 and an inner solid rod 93 with a spring 94 being interposed there between. Thus, the spokes 90a are telescopic and spring-loaded so that the crests of the outer helical member 80 will remain the same or, otherwise stated, the diameters of the turns or convolutions of such helical member will remain constant, irrespective of the spacing between the turns or the pitch of the turns.

It can be appreciated that by virtue of such arrangement, as illustrated in FIGS. 6 through 8, the operating portion of the spiral guide member, between the opposing end wall supporting structures, can be selectively changed in the sense that the pitch of the helical member can be varied, and consequently, the width spacing of the pockets 100 can be varied, dependent upon operating circumstances and conditions, particularly with relation to cloth density and load of fabric.

In this regard, the following table and formula will prove of value, since the table shows the relationship between the number of convolutions in the helix constituting the spiral guide member and the capacity of the dye beck and strand length. The table takes into consideration the volume and length of the tank or box, the liquor ratio, the maximum weight of the fabric being treated and the length of strand.

SPIRAL DYEING DEVICE

Specification:
Volume of box (V) 6,000 litres.
Liquor Ratio (R) 15:1.
Maximum Weight of Fabric (W) 400 kg.
Length of box (L) 400 cm.
Length of strand (S) 80 metres.

| Weight of fabric in gm./r.metre (Wf.) | 50 | 100 | 150 | 200 | 250 | 300 | 350 | 400 | 450 | 500 |
|---|---|---|---|---|---|---|---|---|---|---|
| No. of meters in load | | 4,000 | 2,667 | 2,000 | 1,600 | 1,334 | 1,144 | 1,000 | 890 | 800 |
| No. of strands | | 50 | 34 | 25 | 20 | 17 | 15 | 12 | 11 | 10 |
| Pitch of spiral* (cm.) | | 7.7 | 11.1 | 14.8 | 18.2 | 21.1 | 23.6 | 28.6 | 30.8 | 33.3 |

*Allowing 1 for start and 1 for finish.

NOTE.—Formula: Pitch of Spiral (P) cm. = $\dfrac{L}{\left(\dfrac{V}{R} \times \dfrac{1000}{Wf} \times \dfrac{1}{5}\right)+2}$ A modified form of spiral guide member 130 is illustrated in FIGS. 10 through 12 and is mounted between the end wall supporting structures 132 and 134 in the same position as the spiral guide member of FIGS. 1 and 6 and in the same relationship with the main or drive reel and the carrier chain, as depicted in FIG. 1 in connection with the spiral guide member 24. The spiral guide member 130 is in the nature of an internally unsupported and an unobstructed helical rodlike or wire member that is connected at one end to an end plate 138 which is carried by the drive shaft 140. The spiral guide member 130 is externally supported by stabilizing and bearing rollers 142 and 144 and 146 disposed around the circumference thereof. The rollers are arranged in a triangular pattern, as shown in FIGS. 11 and 12 and are idler rollers in their frictional and stabilizing engagement with the crests of the turns or convolutions of the helical coil member 130.

The rollers 142 and 144 extend between the supporting end wall structures 132 and 134 and have coaxially reduced ends which extend through suitable openings in the supporting end wall structures and which are rotatably journaled in bearing boxes 148 mounted on the exterior surfaces of the end wall structures and provided with adjustable spring loading arrangements 150. In this manner, the rollers are rotatably mounted for free wheeling disposition in surface contact with the crests of the rotating spiral coil, which is rotated through the drive shaft 140 and the rollers bear on the crests of the turns or convolutions, irrespective of the diameter thereof, since there may be a possibility of the diameter slightly changing in accordance with the spread apart or closely grouped arrangement of the turns or convolutions, by virtue of the accordian-like movement of the spiral or helical coil member between the supporting end wall structures.

The front roller 146 is similarly supported at the end wall structure 132 by a spring-loaded bearing arrangement 152 but its opposing end terminates inwardly of the end wall structure 134, adjacent the carrier chain and the drive arrangement so that the first or initial pocket 100a or the helical coil member is unobstructed to enable the carrier chain to form and reform the loop in the normal operation of the apparatus, as disclosed in the recited Ziegler et al. patents and application. Consequently, the end of the front external supporting roller 146 is rotatably mounted in a spring-loaded bearing box 154 that is supported on a bracket 156 which is mounted on the front wall (not shown) of the tank or dye box.

As in the instance of the variable geometry spiral guide member 64, illustrated in FIGS. 6 through 8, the pitch of the convolutions of the helical coil member 130 can be varied and, for this purpose, a cylindrical storage casing or compartment 158 is provided and is formed with a grooved inner end portion 160 that is rotatably mounted on an annular bearing surface opening 162 of a mounting housing 164 that is provided with a mounting flange 166 bolted to the exterior of the supporting side wall structure 132. The opposite end of the casing 158 is closed and is formed with a center opening 168 to receive a rotatable shaft 170 which is provided with a fixed collar 172 fitted thereon and adapted to engage the inner surface of the end wall so as to prevent the shaft from being withdrawn from the casing. The inner end 174 of the shaft is provided with an outwardly projecting, radial finger or traveller 176 that is in constant engagement with the turns or convolutions of the helical coil member, as shown in FIG. 10. The shaft 170 has an outer end portion 178 which is exteriorly threaded so as to receive a jam nut 182 that is provided with a hand wheel 184. The outer end portion 178 of the shaft carries a fixed operating hand wheel 186 and the outer end of the casing is formed with a hand wheel 188.

It can be appreciated that when the jam nut is tightened against the fixed external collar 190 on the outer end wall of the casing, the casing will rotate with the helical coil 130 and the stored turns or convolutions in the casing will rotate as a unit with the extended operating turns disposed between the end wall structures 132 and 134 and actually making up or composing the spiral guide member. By releasing the jam nut, it can be appreciated that the shaft 170 will be free to rotate relative to the casing and by turning the shaft in either a clockwise or counter-clockwise direction the turns or convolutions of the helical coil member will be drawn into or released from the storage casing so as to advance out between the end wall structures or withdraw from between the end wall structures a certain number of turns or convolutions of the helical coil member. In this manner, the geometry of the spiral guide member may be varied depending upon operating conditions, such as fabric density and bulk weight and other factors in connection with the liquid scouring, treating or dyeing of the fabric in the beck or box.

The casing end of the helical coil member or spiral guide member 130 can be directly driven by a drive take-off arrangement from the drive arrangement for the drive shaft 140, such drive take-off arrangement being cordinated with the drive shaft rotation so that both ends of the spiral guide member would be positively driven in the event that the load of the casing should prove to be too much for the drive shaft 140 transmitted through the coil and interfere with the desired timed rotation of the spiral guide member 130 with the carrier chain.

Also, it is to be understood that the spiral guide member can be provided at both ends with end plates, one of which would be driven by the drive shaft and the other of which would be rotatably mounted on the end wall without the casing, that is, without the means for varying the pitch thereof.

As shown generally in FIG. 1 and, more particularly in FIG. 15, a curved stationary guide bar 192 is provided adjacent the initial or first pocket 100a of the spiral guide member, irrespective of the make-up or composition of the spiral guide member. The guide bar 190 is slanted upwardly and outwardly from the liquid chamber 14 toward the front wall 20 below the first or initial pocket of the spiral guide member, as shown in FIG. 1 and, as shown in FIG. 15, is disposed from the inner surface of the end wall structure or from the end wall structure to the front wall of the tank and is positioned so that the arcuate protrusion thereof underlies the initial pocket and is engaged by the forming loop as it is being drawn by the carrier chain. The forming loop engages the curved stationary guide bar to cause the fabric to slide into the first pocket of the spiral guide member during loading of the apparatus or during the processing of the formed loops.

Attention is now directed to FIG. 13 wherein control means is provided for operation in the event of the roped fabric becoming tangled or fouled on the winch roller. As shown in more detail in FIG. 13 and generally in FIG. 1, the control means comprises a double cranked bar 194 which is rotatably mounted in the end wall supporting structure 16 of the tank at the drive end of the apparatus and which has a long shank or rod portion 195 that is positioned below the main reel. The outer end of the double crank bar 194 is adapted to engage a limit switch 198, which is operative to give either an audible or visual warning in addition to stopping the machine by shutting down the prime mover for the drive arrangement of the type disclosed in the Ziegler et al. patents.

As illustrated in FIG. 13, the limit switch is disposed externally of the tank. The bar 19 is disposed below the lowermost portion of the main reel, in its rotational movements, and is designed to be engaged by the loop or loops which may tend to adhere by cohesion to the surface of the main reel instead of dropping down directly therefrom to the sloped bottom wall 14 as shown in FIG. 1. Under ideal operating conditions, the loops will drop away from the surface of the rotating main reel, as shown in FIG. 1. But under some malfunctioning conditions, the roped fabric may become tangled or fouled on the surface of the main reel and, under these conditions, the essential apparatus should immediately be stopped, or warning should be given to the operator of the danger, as soon as possible. By positioning the arm 196 below the main reel, as shown in FIG. 1, and in greater detail in FIG. 13, and especially utilizing the same with the limit switch 198, it can be appreciated that the danger of the apparatus operating with one or more of the loops tangled or fouled on the main reel is obviated.

Figure 14:
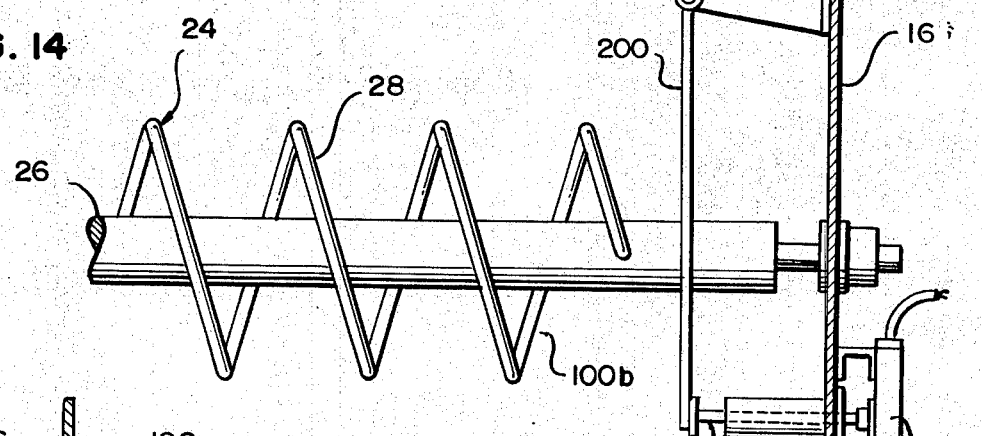
FIG. 14 is a fragmentary top plan view of one end of the spiral guide member, in accordance with any of the previously disclosed forms, and showing as top or control means for preventing over-running of the roped fabric in the last pocket of the spiral guide member in the event of an error in the loading of the spiral apparatus or as the result of the fabric extending in length while processing.

In the event of an error in the loading of the spiral apparatus or as the result of the roped fabric extending in length in the processing, it is desirable that the apparatus be immediately shut down so as to prevent over-runs of fabric on the machine. Thus, as illustrated in FIG. 14, in the event that loops should pile up in the last pocket 100b of the spiral guide member, the piled up loops will tend to engage and act upon a lever 200, which is freely pivoted on a supporting bracket 202 projecting internally from the adjacent end wall supporting structure 16. The free end of the pivoted arm through a suitable opening in the end wall structure 16 and is operative to activate at its outer end a limit switch 204 which is operative, in a manner well known in the art, to act directly upon the prime mover for the drive arrangement and de-energize the same while either giving an audible or visual warning.

What is claimed is:

1. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and means for imparting to the roped fabric through the point of attachment of the fabric to the carrier a positive de-twisting action with every complete circuit of the carrier around the drive reel and the spiral guide member.

2. The apparatus of claim 1 wherein said carrier is composed of an endless chain having means projecting laterally therefrom at one point thereon and directed inwardly toward the ends of the drive reel and the spiral guide member and to which the leading end of the roped fabric is attached, said positive detwisting means including a shaft assembly having means for directly receiving the leading end of the roped fabric, a sprocket fixedly circumposed on the shaft assembly, a pin rotatably supporting the shaft and attached to the carrier chain and a fixed rack passageway arrangement through which the carrier chain moves and carries the sprocket so that the sprocket makes one complete revolution and revolves the shaft assembly one complete revolution whereby a twist is imparted to the shaft assembly and transmitted positively to the roped fabric.

3. The apparatus of claim 1 wherein said positive de-twisting means comprises a flexible shaft attached to the carrier and to which the leading end of the roped fabric is attached, said shaft having a fixedly related sprocket, a fixed rack arrangement over which the sprocket moves with an interengaging relation as the carrier makes one complete revolution so that the sprocket imparts a positive revolution movement to the shaft which is transmitted by the shaft directly to the fabric.

4. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and the spiral guide member including a helical member having spaced apart convolutions, the convolutions defining the movable pockets with one of the pockets being disposed adjacent to the carrier and adapted to receive the loop formed by the revolutionary movement of the carrier around the ends of the drive reel and the spiral guide member and a curved stationary guide bar carried by the tank and disposed angularly below the first pocket of the helical member so as to cause the roped fabric to slide positively into the initial pocket as the loop is formed by the carrier.

5. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and said spiral guide member being composed of a supporting shaft and a helical coil member capable of a moderate degree of lateral distortion mounted on the shaft by radial spokes.

6. Apparatus of claim 5 wherein the spokes are formed from non-corrodible flexible material.

7. Apparatus of claim 5 wherein the coil member and the spokes are formed from non-corrodible flexible material.

8. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and a stop control means provided in association with the drive reel for stopping operation of the apparatus in the event of the roped fabric becoming tangled on the drive reel.

9. The apparatus of claim 8 wherein said stop control means includes a double cranked bar disposed below the drive reel and having an outer end rotatably mounted through one end wall of the tank and a swinging arm carried by the outer end and a limit switch adapted to be engaged by the swinging arm.

10. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and a sensing member mounted in the last pocket of the spiral guide member and a limit switch activated by said sensing member so as to prevent over-runs of fabric on the apparatus by stopping operation of the apparatus in the event of overloading of the last pocket.

11. The apparatus of claim 10 wherein said sensing member comprises a lever pivotally carried by the end wall of the tank and having a free end, an arm carried by said free end and slidably extending through the end wall to actuate the limit switch, said arm being disposed through the end of the last pocket of the spiral guide member.

12. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and said spiral guide member including a supporting shaft having two concentrically related helical coil members mounted thereon and including an inner and an outer helical coil member, said inner and outer coil members being connected together by radial spokes, said inner coil member being slidably and rotatably disposed on the shaft and said outer coil member being radially spaced outwardly from the inner coil member and the turns of said outer helical coil member defining the movable pockets of the spiral guide member and means for varying the pitch of the helical coil members.

13. The apparatus of claim 12, wherein said spokes are of telescopic spring-loaded construction.

14. The apparatus of claim 12 wherein said means for varying the pitch of the concentric helical coil members includes a cylindrical storage casing rotatably mounted on one end wall of the tank and having an open inner end in communication with the interior of the tank, said shaft extending centrally through the casing and said casing having an outer end through which the shaft extends, locking means for releasably fixing the casing to the shaft for rotation therewith and for releasing the casing for independent rotation on the shaft and means carried on the inner end of the casing for operating on the outer helical coil member in drawing the helical coil members into and releasing the helical coil members from the storage casing.

15. The apparatus of claim 12 wherein said means on the inner end of the casing includes a fixed traveller extending radially inwardly from the casing and disposed in constant engagement with the convolutions of the outer helical member.

16. Apparatus for treating textile fabrics in rope form comprising a tank having opposing end walls and a bottom liquid chamber, a drive reel rotatably mounted in the tank horizontally above the chamber for drawing roped fabric into the tank in the formation of a cloth helix and revolving loops of the helix after formation thereof, a spiral guide member rotatably mounted in the tank horizontally above the chamber and in spaced parallel relation with the drive reel, said spiral guide member having movable pockets for guiding the fabric in spaced loops on the drive reel, a carrier disposed at one end wall of the tank and movable in a vertical orbital path around the adjacent ends of the drive reel and spiral guide member and having means whereby the leading end of the roped fabric is attached thereto and carried thereby around the ends of the drive reel and the spiral guide member, said drive reel and the spiral guide member being rotated and the carrier being revolved in timed relation with the spiral guide member so that the roped fabric helix is formed in spaced apart loops around the spiral guide member and the drive reel with a loop being formed by the carrier in relation to the drive reel and the spiral guide and with the laid-up loops being revolved by the main reel and being guided by the spiral guide member, and said spiral guide member comprising a helical coil member and a plurality of supporting rollers disposed about the circumference of the helical coil member in stabilizing and supporting engagement with the crests of the convolutions of the coil member.

17. The apparatus of claim 16 wherein said rollers are spring mounted and are resiliently urged into engagement with the crests.

18. The apparatus of claim 16 wherein one of said supporting rollers is disposed at the front of the helical coil member and terminates before the first pocket of the helical coil member so that the first pocket adjoining the carrier is unobstructed.

19. The apparatus of claim 16 wherein said supporting rollers are disposed in a triangular pattern and include at least three rollers comprising an upper, a back and a front roller, said upper and back rollers being rotatably journaled in the end walls of the tank and the front roller being journaled in one end wall and being spaced from the other end wall at the initial pocket of the spiral guide member and being carried by the front wall of the tank so that the initial pocket is unobstructed, said front roller functioning also to maintain the loops in position in the pockets to prevent radial outward withdrawal of the loops from the pockets.

20. The apparatus of claim 16 wherein one end of the helical coil member is attached to an end plate, said end plate being connected to a driving shaft and means is provided in association with the opposite end of the helical coil member for varying the pitch of the helical coil member between the end walls of the tank.

References Cited

UNITED STATES PATENTS 3,308,639   3/1967   Ziegler et al. _____ 68—176
3,460,362   8/1969   Kilgour et al. _____ 68—176

WILLIAM I. PRICE, Primary Examiner

UNITED STATES PATENT OFFICE
CERTIFICATE OF CORRECTION

Patent No. 3,545,236                     Dated   December 8, 1970

Inventor(s) George Edward Ziegler and Gilbert Innes Kilgour

It is certified that error appears in the above-identified patent and that said Letters Patent are hereby corrected as shown below:

Column 3, Line 1, "carrire" should be -- carrier --.
Column 3, Line 11, "members" should be -- member --.
Column 3, Line 26, "other" should be -- outer --.
Column 3, Line 52, "pocekts" should be -- pockets --.
Column 4, Line 30, "as top" should be -- a stop --.
Column 7, Line 48, "Patent Number 3,308,639" should be inser after "Ziegler et al".
Column 7, Line 52, "dircetly" should be -- directly --.
In the Table, $\dfrac{L}{\left(\dfrac{V}{R} \times \dfrac{1000}{Wf} \times \dfrac{1}{5} + 2\right)}$ should be $\dfrac{L}{\left(\dfrac{V}{R} \times \dfrac{1000}{Wf} \times \dfrac{1}{S} + 2\right)}$
Column 11, Line 21, "195" should be -- 196 --.
Column 11, Line 29, "19" should be -- 196 --.
Column 11, Line 59, after "pivoted arm" the following phrase should be added -- 200 carries an externally projecting fing 202 that slides --.

Signed and sealed this 17th day of August 1971.

(SEAL)
Attest:

EDWARD M. FLETCHER, JR.
Attesting Officer

WILLIAM E. SCHUYLER, JR.
Commissioner of Patents